United States Patent
Cooper et al.

(10) Patent No.: US 6,237,849 B1
(45) Date of Patent: *May 29, 2001

(54) REMOTE SMARTCARD TERMINAL LINK

(75) Inventors: Dean Anthony Cooper, Gladesville; Peter Achelles, Lane Cove, both of (AU)

(73) Assignee: Keycorp Limited (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,593
(22) PCT Filed: Jul. 31, 1996
(86) PCT No.: PCT/AU96/00481
§ 371 Date: May 11, 1998
§ 102(e) Date: May 11, 1998
(87) PCT Pub. No.: WO97/05582
PCT Pub. Date: Feb. 13, 1997

(30) Foreign Application Priority Data

Jul. 31, 1995 (AU) .................. PN 4475

(51) Int. Cl.[7] ........................... G06F 5/00
(52) U.S. Cl. ........................ 235/380; 235/492
(58) Field of Search .................. 235/380, 492

(56) References Cited

U.S. PATENT DOCUMENTS 4,947,028 * 8/1990 Gorog .................... 235/381
5,036,461 * 7/1991 Elloitt et al. ............ 235/380

FOREIGN PATENT DOCUMENTS

| 3835 479 | 5/1989 | (DE) . |
| 3903 718 | 8/1989 | (DE) . |
| 0 623 903 A2 | 5/1994 | (EP) . |
| WO 89/11130 | 11/1989 | (WO) . |
| WO 91/10214 | 7/1991 | (WO) . |
| WO 92/06438 | 4/1992 | (WO) . |
| WO 97/07217 | 3/1994 | (WO) . |
| WO 94/10649 | 5/1994 | (WO) . |
| WO 95/20195 | 7/1995 | (WO) . |
| WO 95/22113 | 8/1995 | (WO) . |

* cited by examiner

Primary Examiner—Harold I. Pitts
(74) Attorney, Agent, or Firm—Akerman Senterfitt

(57) ABSTRACT

A system and device allowing for an inexpensive smartcard terminal is disclosed, particularly where more than one scheme is required to be supported. Remote terminals 20 receive smartcards 10 and establish a communication link 30 with a base station. Each remote terminal uses a scheme independent application 24 to interface with the smartcard 10—the base terminal includes the necessary terminal applications 43–45, a scheme selector 40, and establishes links to host systems 80–82. This arrangement allows for reduced complexity and cost in the remote terminals, while allowing for multiple and/or complex applications to be supported.

16 Claims, 14 Drawing Sheets

REMOTE SMARTCARD TERMINAL LINK

TECHNICAL FIELD

The present invention relates to systems for performing financial transactions using smart cards and similar devices.

BACKGROUND ART

Smartcard technology is increasingly being adopted for a variety of financial transactions. By way of example, these include stored value, banking and point of sale applications, pay TV, pay phones, loyalty schemes, electronic tolling and electronic ticketing. Such systems generally utilise a smartcard issued to users, readers for the cards, hardware and software associated with the reader for performing a transaction, and in many cases, a communications link to a host system.

The term smartcard is used throughout this document to refer to all portable devices including a processing device and storing financial or identification information, including but not limited to devices meeting ISO standard 7816.

Current developments and proposals tend to utilise smart cards and transaction applications which are proprietary to particular developments. In order to use a card, customers must use a terminal which supports the particular system implemented on that card.

Prior Art FIG. 1 illustrates a typical system based on these techniques. Terminals 3A and 3B each support only a single scheme. Terminal 3C contains multiple applications, each residing in terminal 3C, which can each support a single scheme. Multi-scheme functionality is accordingly provided by having different applications to support each scheme resident in each terminal. This type of functionality will increasingly be required in new terminals. In the case of fixed location, relatively high cost terminals this requirement can readily be accommodated, as substantial processing and memory resources are available.

However, a further likely and intended outcome of stored value-type schemes is that low cost, potentially portable terminals will come into widespread use. According to conventional methodologies, these terminals would need to be either single scheme specific at best, or unacceptably expensive.

It is accordingly an object of the present invention to provide a smart card transaction system and terminal which enable the implementation of multiple schemes within a low cost terminal environment.

SUMMARY OF THE INVENTION

Accordingly to one aspect the present invention provides a system for performing a transaction using a smart card, said smart card including an application allowing transactions with at least one transaction scheme, said system including at least one remote terminal device, each said remote terminal device including means for interfacing to a smart card, a scheme independent terminal application, and communications means for communicating with a base terminal, said base terminal including a plurality of smart card terminal applications for different transaction schemes, and means for selecting one of said smart card terminal applications corresponding to an available transaction scheme for any given smart card, the arrangement being such that upon a smartcard being inserted into the remote terminal, a corresponding terminal application is selected and a transaction conducted between the terminal application and the smartcard.

According to another aspect the present invention provides a system for performing a transaction using a smart card, said smart card including an application allowing transactions with at least one transaction scheme, said system including at least one remote terminal device, each said remote terminal device including means for interfacing to a smart card, and communications means for communicating with a base terminal, said base terminal including at least one smart card transaction application corresponding to an available transaction scheme for a given smart card, the arrangement being such that a transaction occurs between the smart card and the base terminal as if the smart card were directly interfaced to the base terminal.

According to a further aspect the present invention provides a remote terminal device for a smartcard transaction processing system, said system including a plurality of smartcards, each smartcard including applications allowing transactions with at least one transaction scheme, and a base terminal including transaction applications corresponding to at least one of the transaction schemes incorporated in said smartcards, wherein said terminal device including means for interfacing to a smart card, a scheme independent terminal application, and communications means for communicating with a base terminal, said remote terminal device being adapted to communicate with said smartcard and said base terminal so as to facilitate a transaction between the smartcard and the base terminal as if the smartcard were directly interfaced to the base terminal.

The present invention accordingly provides a system wherein a base terminal provides appropriate interfaces, links to host systems, and applications for a plurality of smart card transaction applications, and the base terminal is accessed by many less complex remote terminal devices. This enables the competing requirements of multi-scheme operation and low cost to be fulfilled.

According to the inventive system, the base terminal responds as if it were in physical contact with the smart card, although in fact the card may be remotely linked and accessed. This allows for a single set of complex applications to service many low cost remote terminals.

BRIEF DESCRIPTION OF DRAWINGS

An embodiment of the present invention will now be described with reference to the accompanying figures, in which.

DESCRIPTION

The present invention will be described with reference to various implementations, principally in the field of stored value cards. It will be appreciated, however, that the present invention is equally applicable to other smart card applications.

Figure 1:
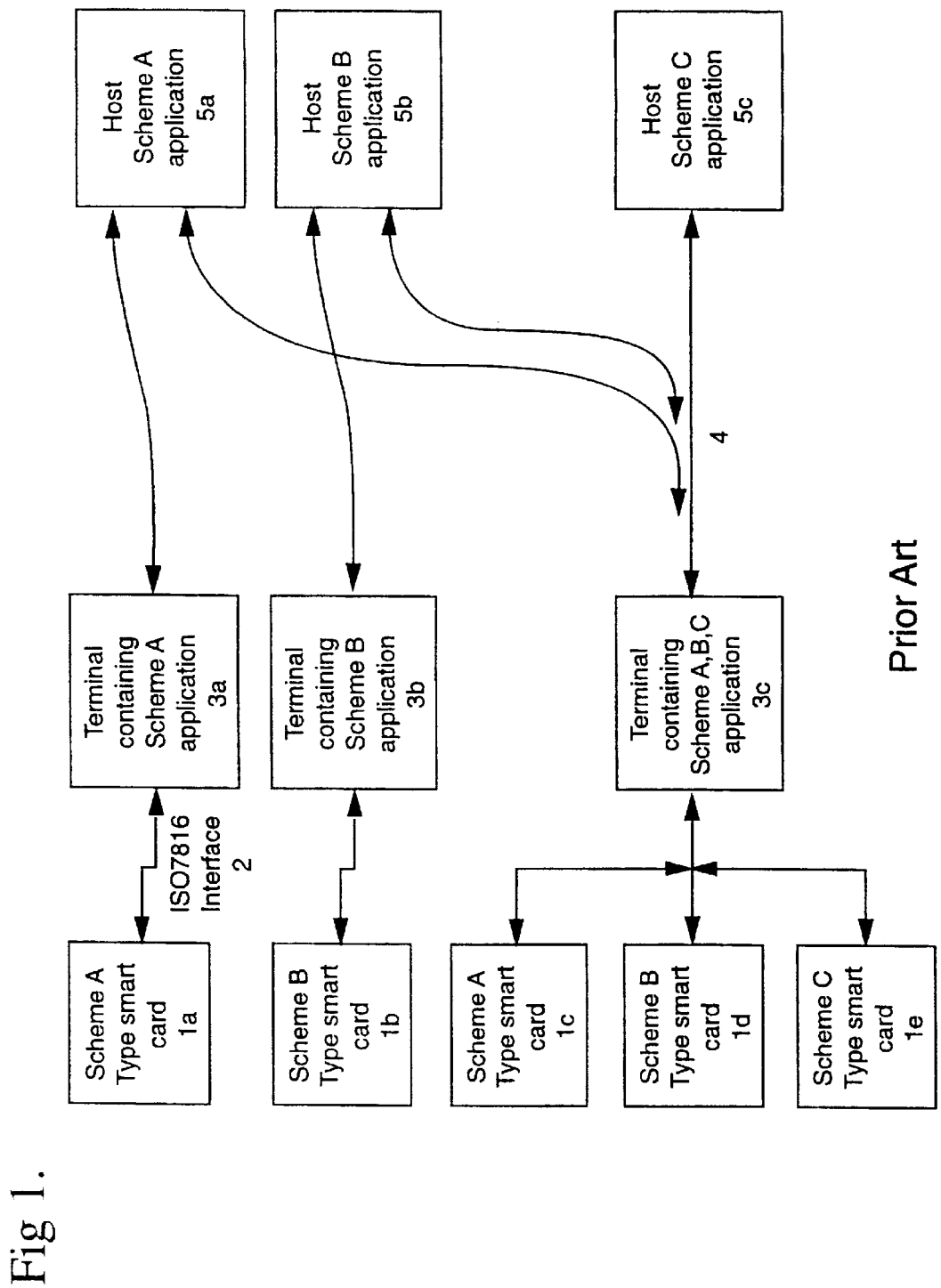
FIG. 1 illustrates a prior art smart card interface system.
Figure 2:
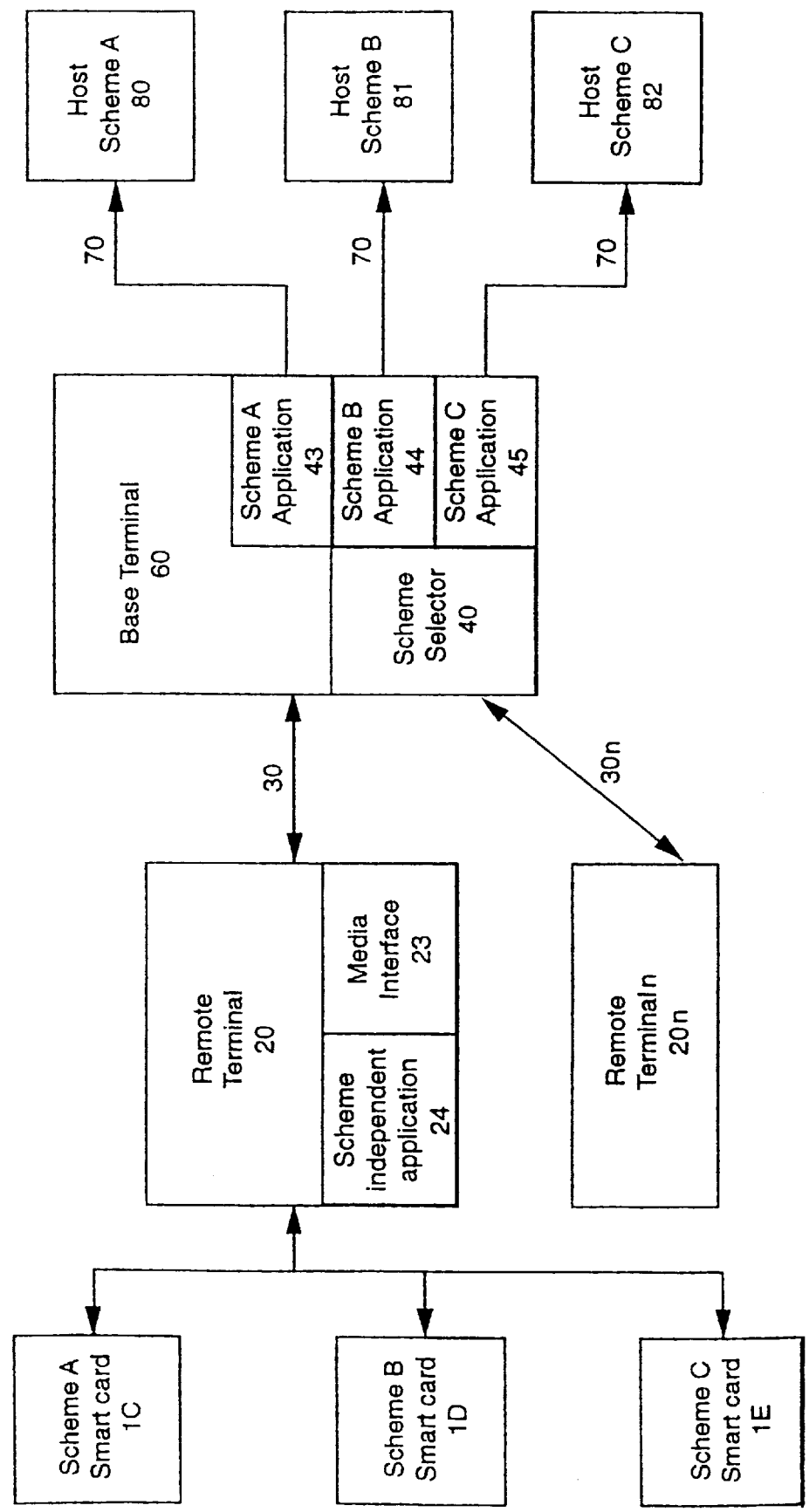
FIG. 2 illustrates is a functional block diagram illustrating the operation of the inventive system.

FIG. 2 illustrates the principle of the present invention. 3 types of smartcard schemes are accepted by the remote terminal 20, shown as schemes A, B and C on respective cards 1C, 1D and 1E. Remote terminal 20 incorporates a scheme independent application 24, for interfacing with any of the schemes, and a media interface 23. Media interface 23 provides a communications link with base terminal 60—it will be appreciated that there may be many remote terminals 20n associated with a single base terminal 60. Base terminal 60 incorporates a scheme selector, for determining the appropriate scheme for a particular smartcard, and applications 43, 44, 45 for providing the appropriate terminal application. Thus, a link is established between the smartcard and the base terminal, in which the remote terminal is generally acting as an intermediary. The terminal applications 43, 44, 45 are connected via suitable communications links 70 to the respective hosts. It will be appreciated that the present invention is also applicable to a single scheme implementation, as it allows for a reduction in cost and complexity of the remote terminal even in this case.

Figure 3:
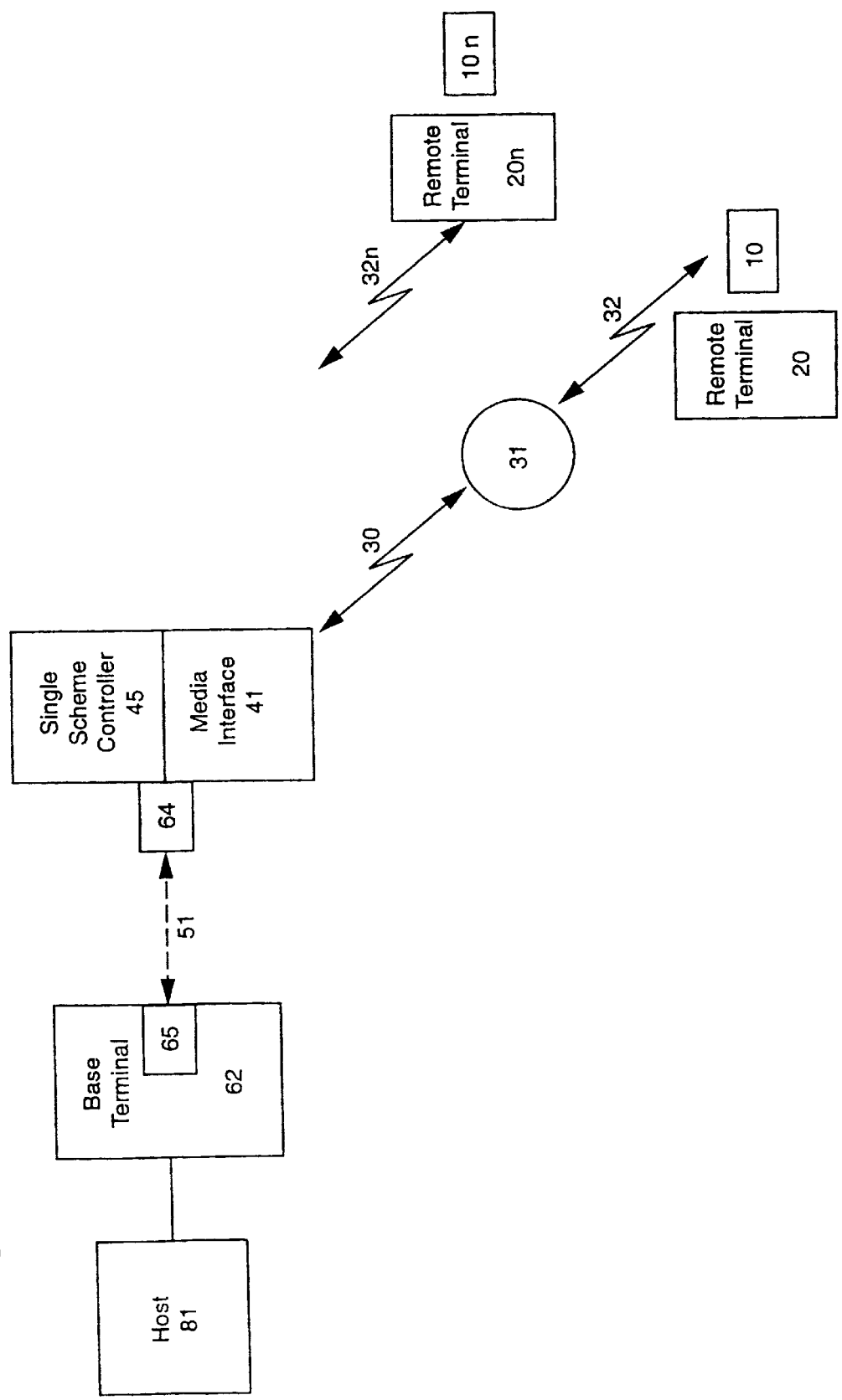
FIG. 3 is a block diagram illustrating one implementation of the present invention.

Referring to FIG. 3, a first implementation of the present invention is described. Base terminal 62 is connected via an ISO 7816 compatible card emulation interface 65, 64 and communications link 51 to a single scheme controller 45, and a media interface 41. It will be appreciated that from the perspective of the application residing on base terminal 62, an equivalent interface is provided as if a smart card were directly connected. Media interface 41 provides a connection via transmission media 30 to remote terminals 20, 20n. It will be appreciated that a large number of remote terminals may be serviced by a single media interface. The communications linkage between media interface 41 and remote terminals 20 may be of any desired type, for example, hard-wired, fibre optic, acoustic, infra-red or radio. In the implementation illustrated, a router 31 provides individual links 32, 32n to remote terminals, connected in a star topology, and then interfaces via communications link 30 to the media interface 41. It will be appreciated that any suitable communications arrangement could be used. For example, in an environment with many base stations, a remote terminal may connect to the nearest available terminal, not be specific to a single base terminal.

Scheme controller 45 acts so as to redirect connections to provide an effective linkage between any given remote terminal which is presently active, and the base terminal. Each remote terminal 20 provides an interface for a user smart card 10, and preferably would include features such as a keypad and display. Generally, the base terminal 62 would be connected via conventional landline or satellite links, or any other suitable communications arrangement, to a host system 81.

Figure 4:
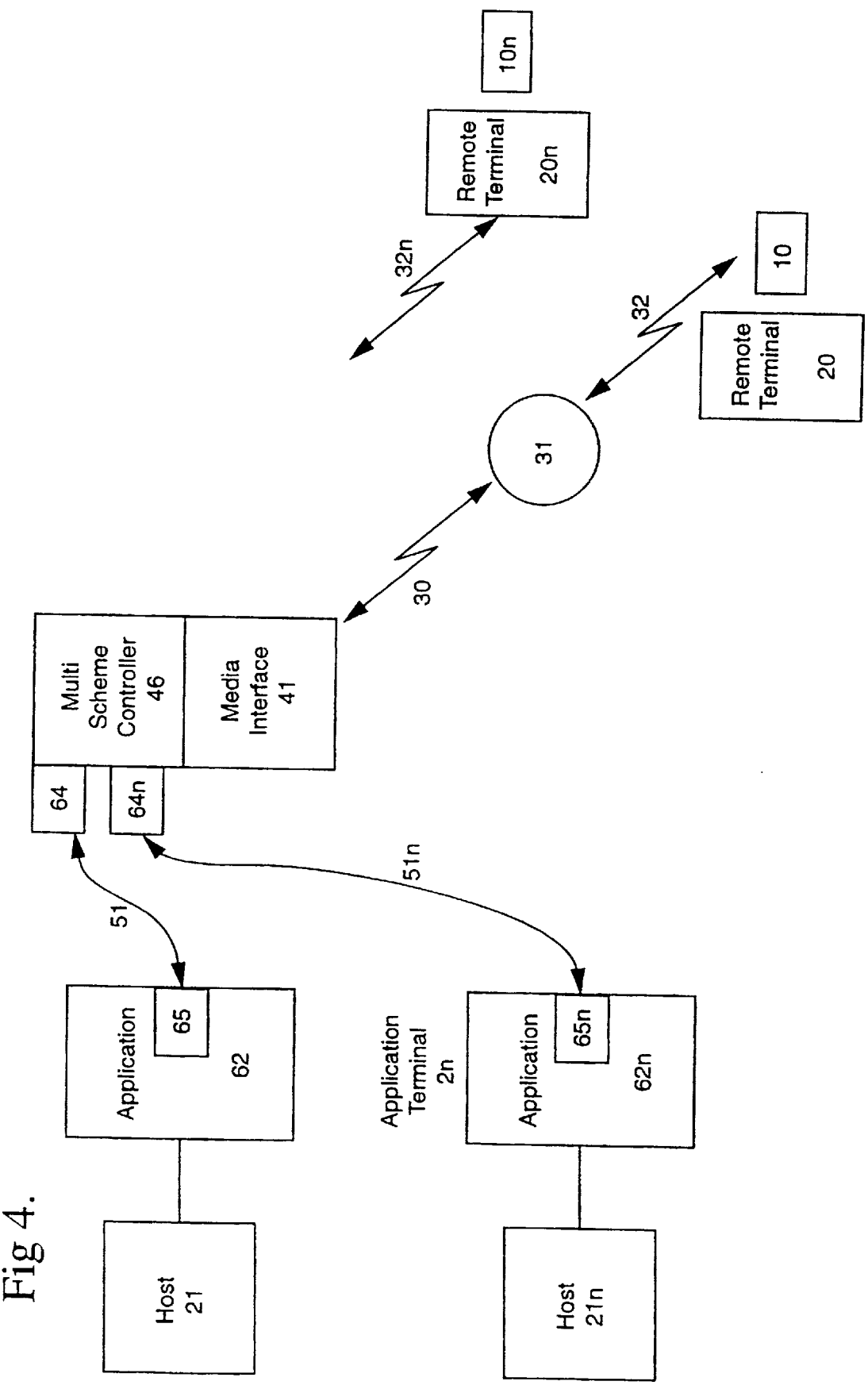
FIG. 4 is a block diagram illustrating a second implementation of the present invention.

Referring to FIG. 4, this illustrates a system similar to FIG. 3, however, in this case the system is capable of supporting multiple existing applications. Instead of a single base terminal 62, and card interface 65, 64, a plurality of base terminals 62n are provided. Multi scheme controller 46 is used so as to provide multiple card emulation interfaces as appropriate for each application. The configuration of the remote terminals and communication links to interface 41 remains the same.

Figure 5:
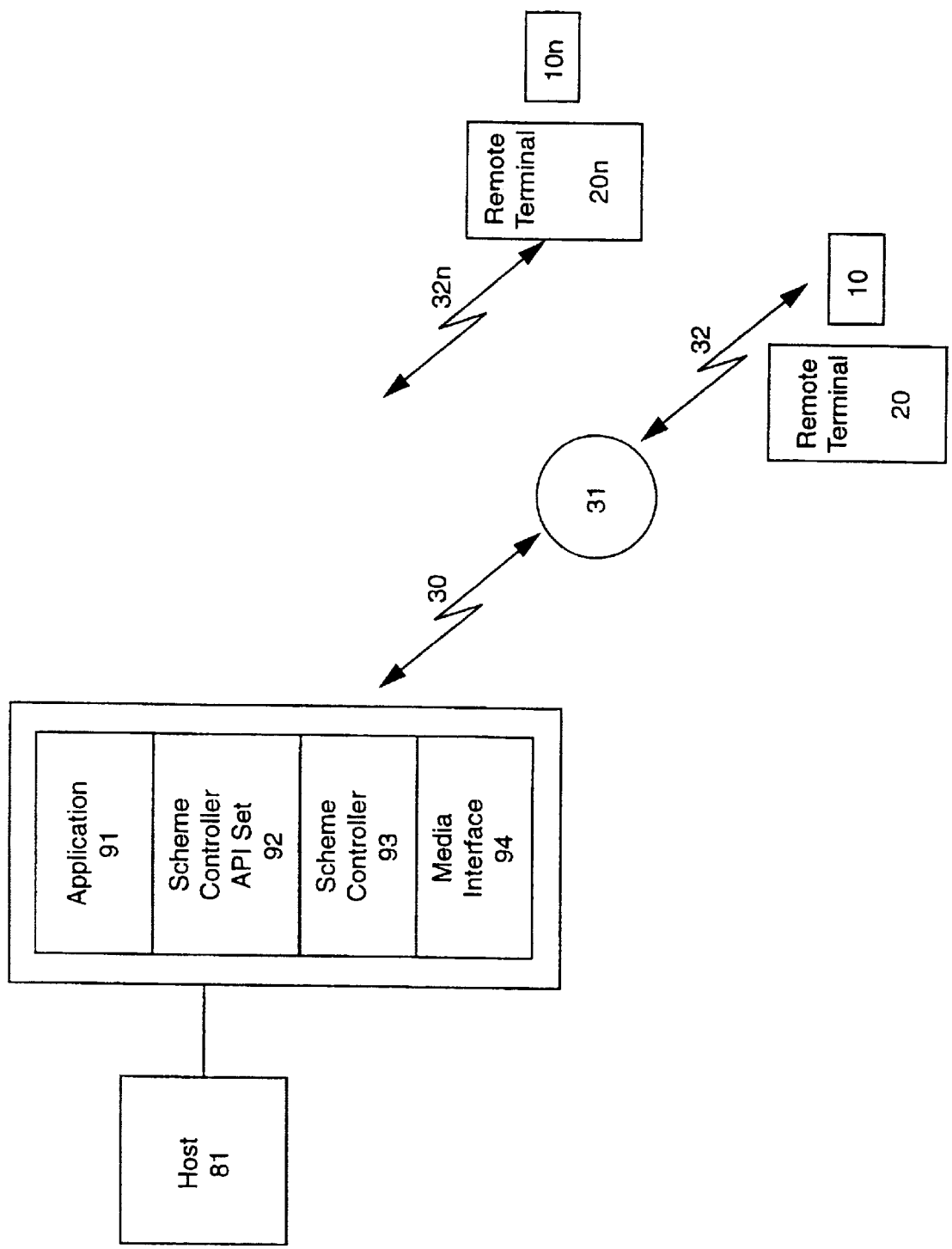
FIG. 5 is a block diagram illustrating a third implementation of the present invention.

FIG. 5 differs from the embodiment of FIG. 3 in that the scheme application program has been integrated into the scheme selector. This approach is more flexible for the introduction of new systems, and provides a higher level of performance. In terminal 66, scheme controller 93 is interfaced to the application 91 by means of an application programming interface (API) set 92. This allows for a complete set of standardised remote card interface procedures to be provided. Media interface 94 operates with the remote terminals in a similar manner to FIGS. 3 and 4.

Figure 6:
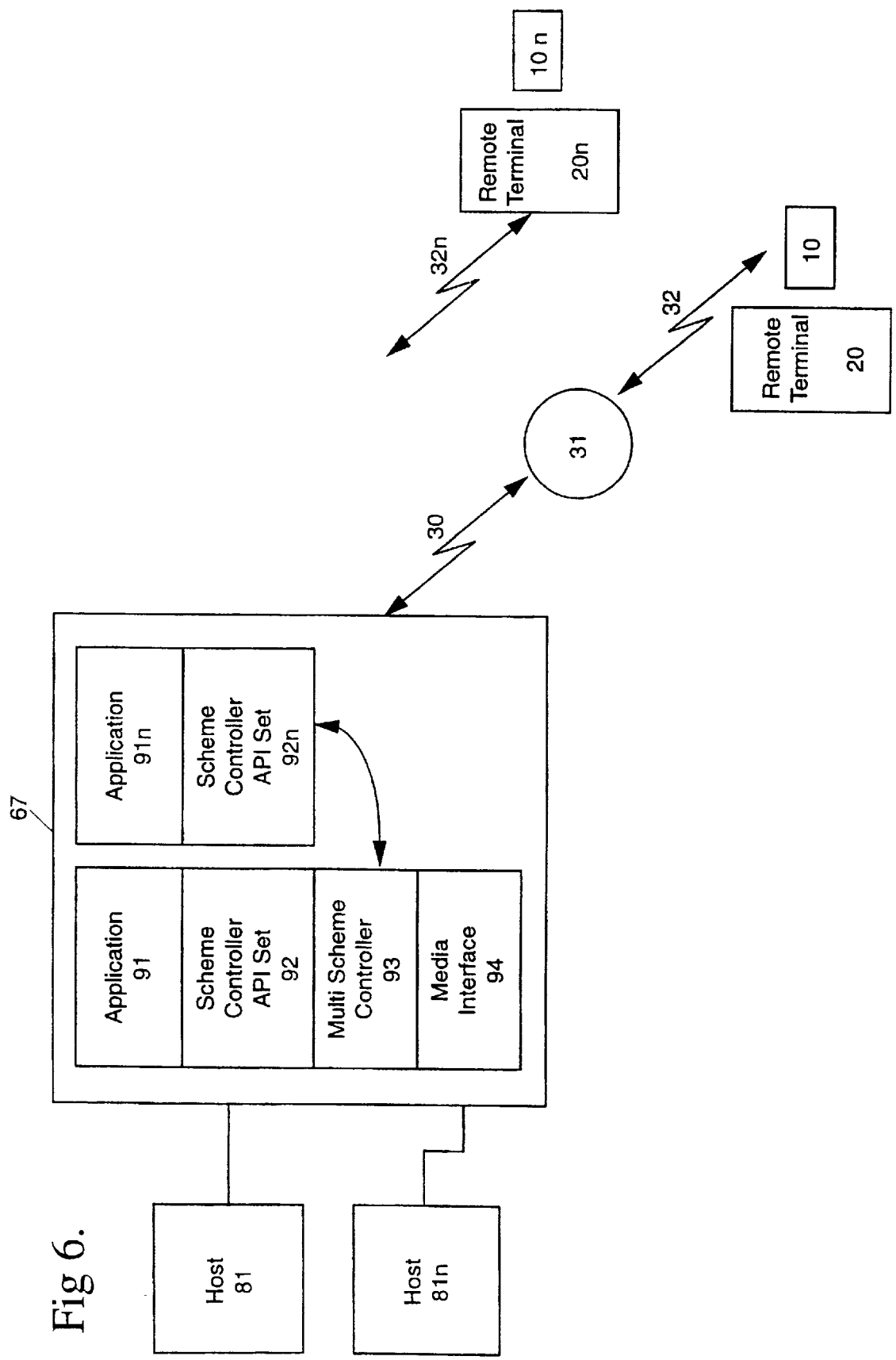
FIG. 6 is a block diagram illustrating a fourth implementation of the present invention.

FIG. 6 illustrates a system similar to FIG. 5, but in which terminal 67 allows for multiple schemes to be supported via a multi scheme controller 93 and separate scheme controller applications and API sets 91n, 92n. It will be appreciated that n is any suitable integer.

Figure 7:
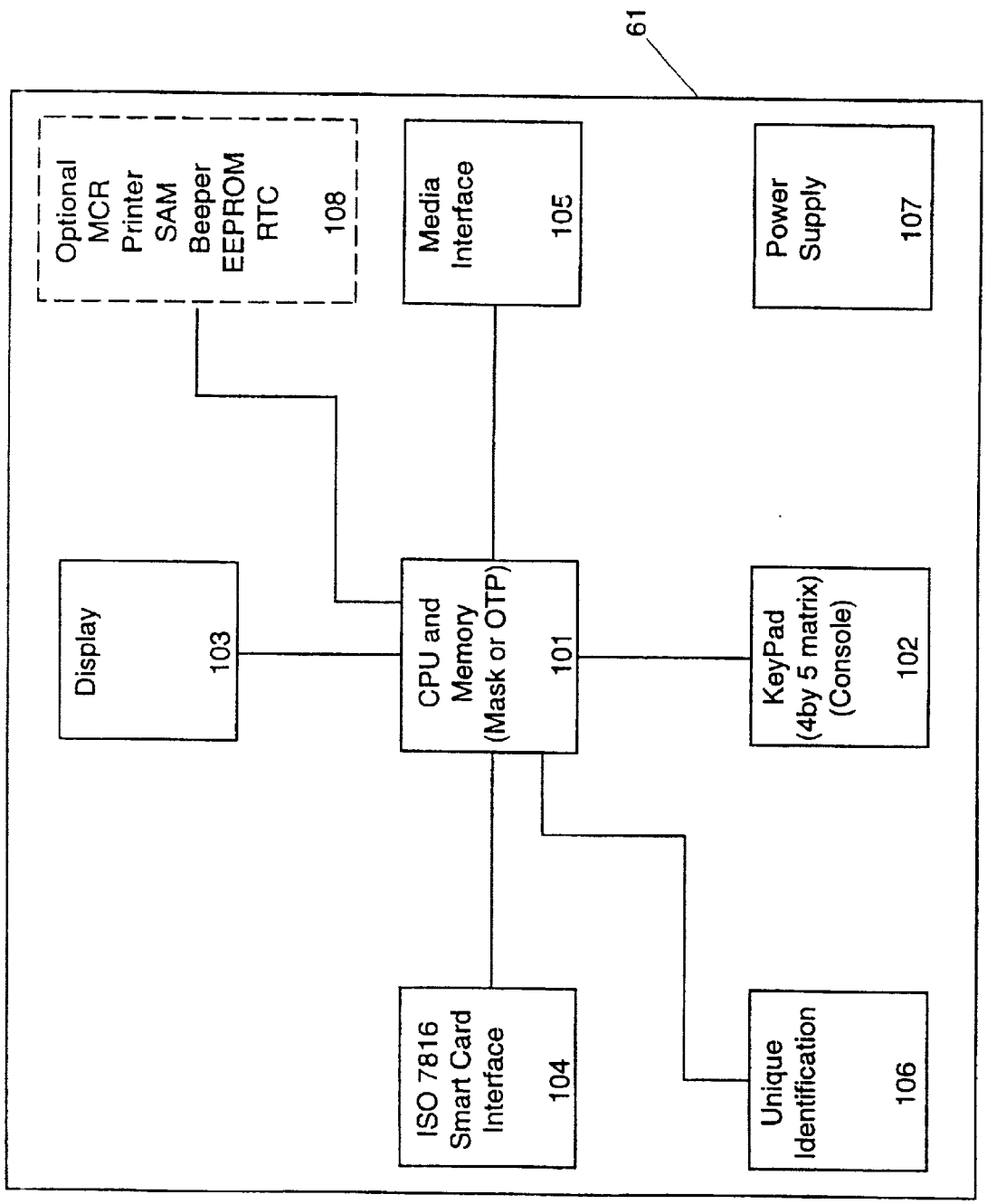
FIG. 7 is a functional block diagram showing the hardware configuration according to an implementation of the present invention.

Referring to FIG. 7, this illustrates in block form a hardware configuration for implementation of the remote terminal according to the present invention. It will be appreciated from the background discussion that one of the objectives of this terminal is to provide a low cost, preferably portable unit, and the design should be optimised to this end. Microcontroller 101 is linked to display 103, ISO 7816 smart card interface 104, unique identification 106, keypad 102, and media interface 105. Optional further features shown in reference 108 include a magnetic card reader, secure access module, eeprom, and a real time clock.

The microcontroller is programmed with code storage of preferably at least 16K bytes. A minimum data storage of 512 bytes (RAM) is required to support the relevant ISO 7816/TO and other smart card protocols and to support the scheme independent application program. On—chip peripherals including timers, serial communications and bit level input/output signals are preferably used in this implementation.

Keypad 102 is preferably implemented as a matrix. In the preferred implementation, a total of 20 keys support PIN entry, account selection and other user entered data required by the scheme application. In some cases, manual scheme selection may also be supported.

Display 103 is preferably of LCD type, including both fixed numeric and dot matrix areas used for text and graphic displays. Special purpose symbols may be used to meet scheme application requirements.

Preferably the smart card connector and interface meet the ISO 7816 specification. Any suitable connector type may be used, but zero insertion force types are preferred. The interface will support asynchronous cards as required by most applications. Optionally, support for synchronous cards may be provided. The interface provides signal conditioning, card detection and power switching.

The parameters of media interface 105 will depend on the transmission media selected. For a hard wired system, standard base band interfaces such as RS-232 or RS-485 may be used. Modems may be used to extend the link over private or public networks, or wireless links may be employed. Typically, the scheme applications written for smart card protocols require a data rate of 9600 baud. The media interface may be networked.

The unique identification block 106 is required to assign each terminal with a unique identification number. Typically, an electrically erasable RAM serial access device is used. Alternatively, a micro controller with on-chip EERAM or battery backed RAM could be used. Additional configuration and status information may also be stored in this manner, for example, sequence information which can be used to expedite reconnection of a remote terminal in the event of link failure during remote access.

The power supply and supervisory block provides the voltage sources required by the terminal hardware, along with supervisory signals to reset the micro controller and protect memory in the event of power failure. Primary power may be conveniently derived from batteries in the case of portable terminals, and some power conversion switching will generally be required.

Figure 8:
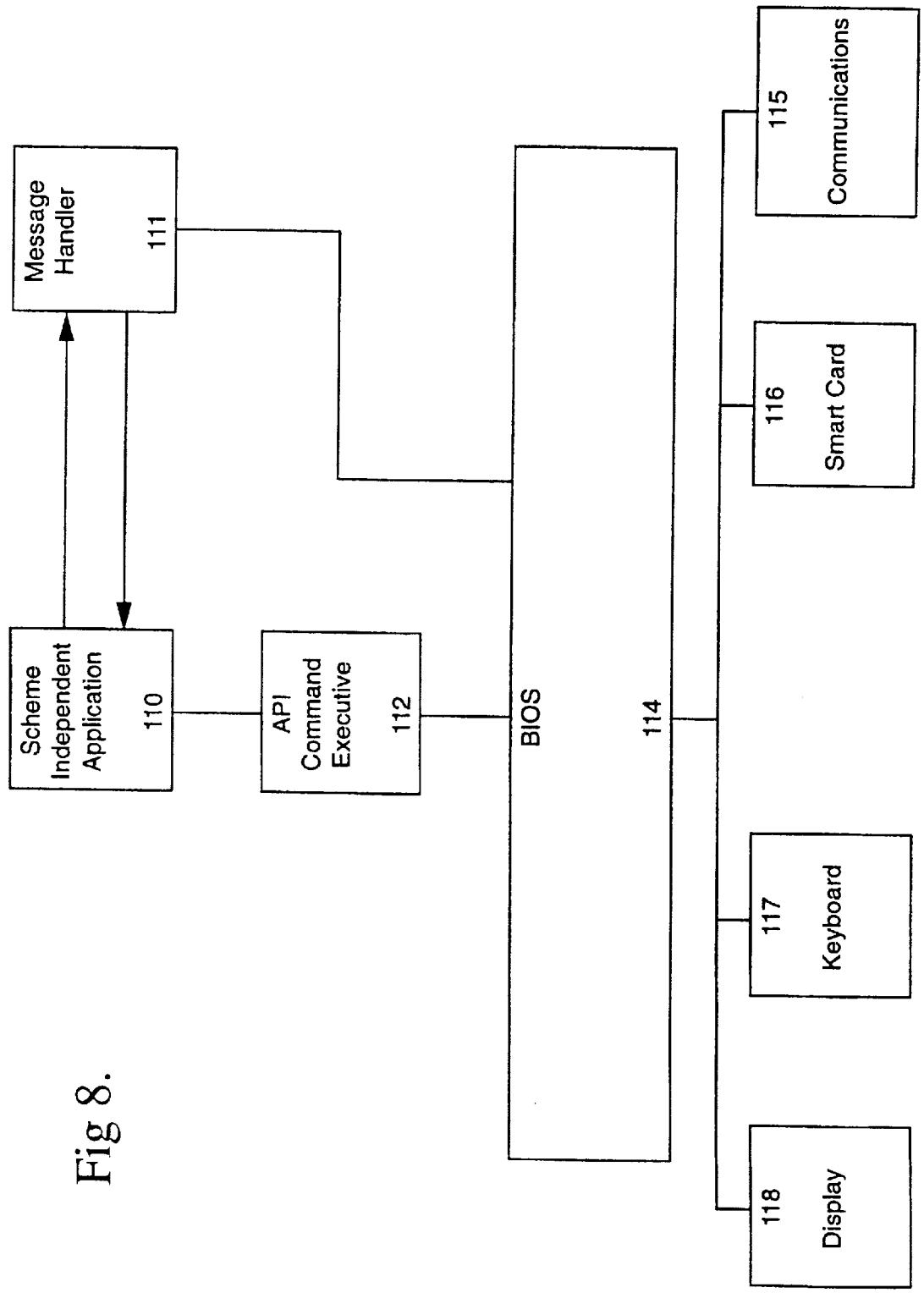
FIG. 8 illustrates the functional model of the software according to an implementation of the present invention.

The software design according to this implementation of the present invention will now be described with reference to FIG. 8. FIG. 8 describes the top level of the system, comprising the scheme independent application 110, message handler 111, application programming interface command executive 112, and basic input/output system (BIOS) 114 which interfaces to the various terminal peripherals. It can be seen from FIG. 8 that BIOS 114 interfaces to, for example, display 118, keypad 117, smart card interface 116 and communications 115.

The software design is intended to provide the various scheme application programs with access to terminal peripherals by means of a structured command interface.

Figure 9:
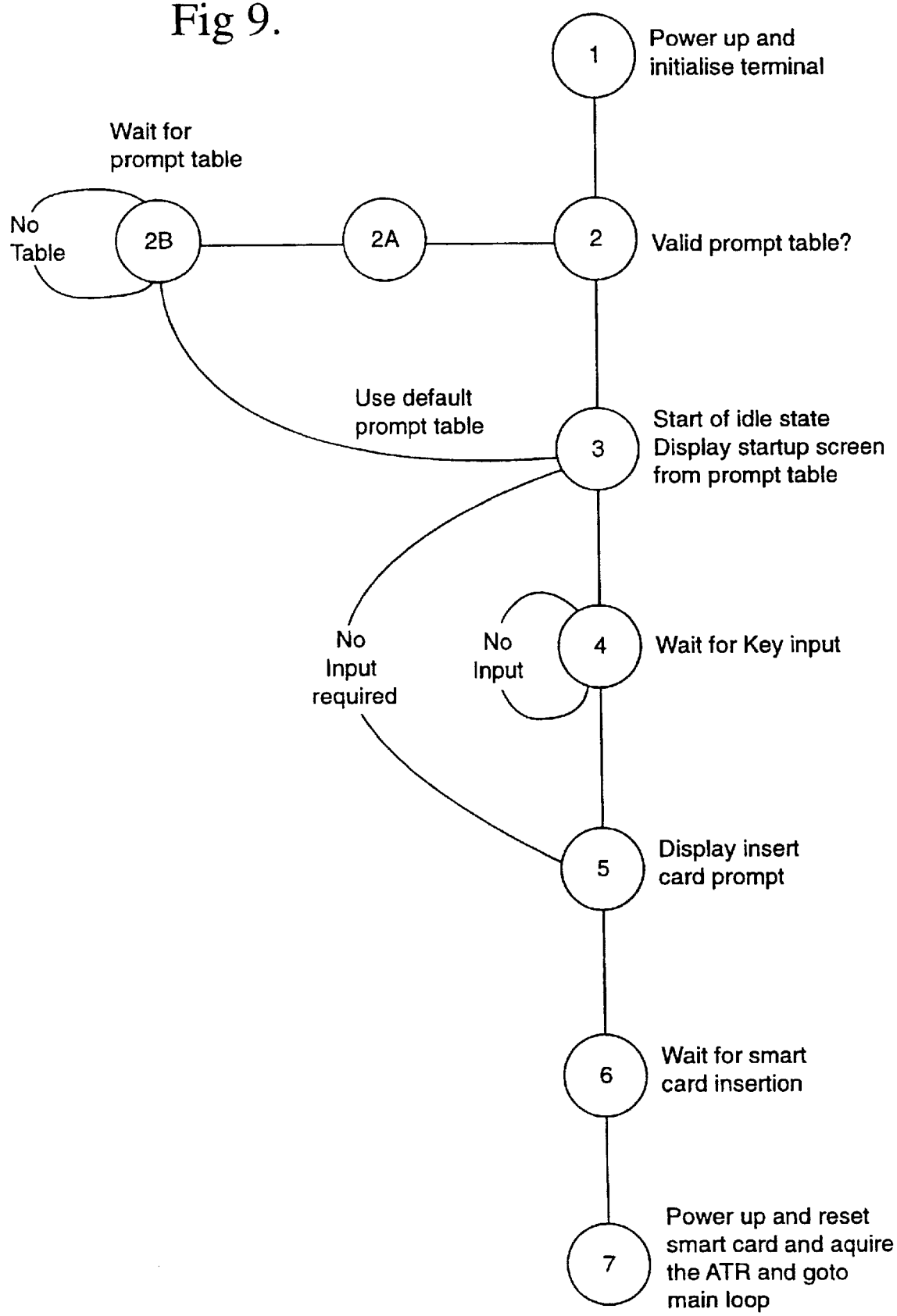
FIG. 9 is a flow chart of a software implementation in the idle state for a remote terminal according to the present invention.
Figure 10:
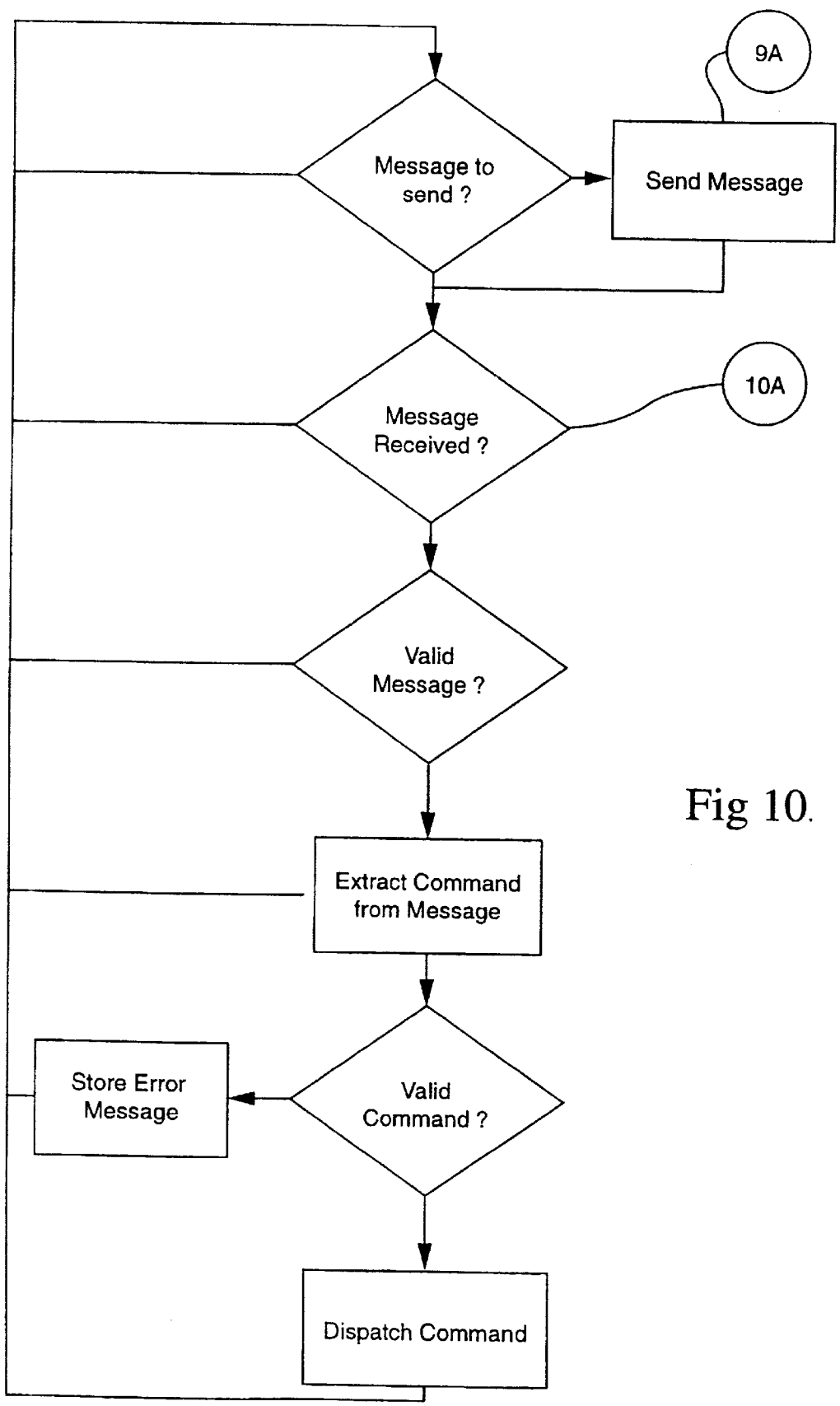
FIG. 10 is a flow chart of the main loop according to the implementation of FIG. 9.

The scheme independent application 110 is summarised in FIGS. 9 and 10. The unit begins execution in the idle state. After completion of power up and initialisation 1, a table of prompts 2a is displayed 3 if found. If the table is not found, a default table 2a may displayed 3 in some cases, otherwise the unit waits for the scheme selector to send one 2b. If manual scheme selection is required, the terminal waits for the user to select the scheme required 4. Otherwise a prompt to insert the user card as displayed 5. On detection of the user cards 6, the card is powered up and reset per ISO 7816 requirement 7. The answer to reset (ATR) data is acquired and stored in the output message buffer 9a (see FIG. 10). Execution then proceeds to the main loop illustrated in FIG. 10.

The main loop checks for messages from the output buffer 9a to be sent to the scheme selector. If found, the message is sent. The message input buffer 10A is also checked for incoming messages from the scheme. If found this message is validated for its structure and to ensure that it is addressed to this terminal. If the message is valid, the command and data are extracted and if these are valid the command is dispatched to the API command executive, otherwise an error message is built and stored. Execution continues at the start of the main loop. The message system may conveniently support network functions based on the industry standard OSI model.

Figure 11:
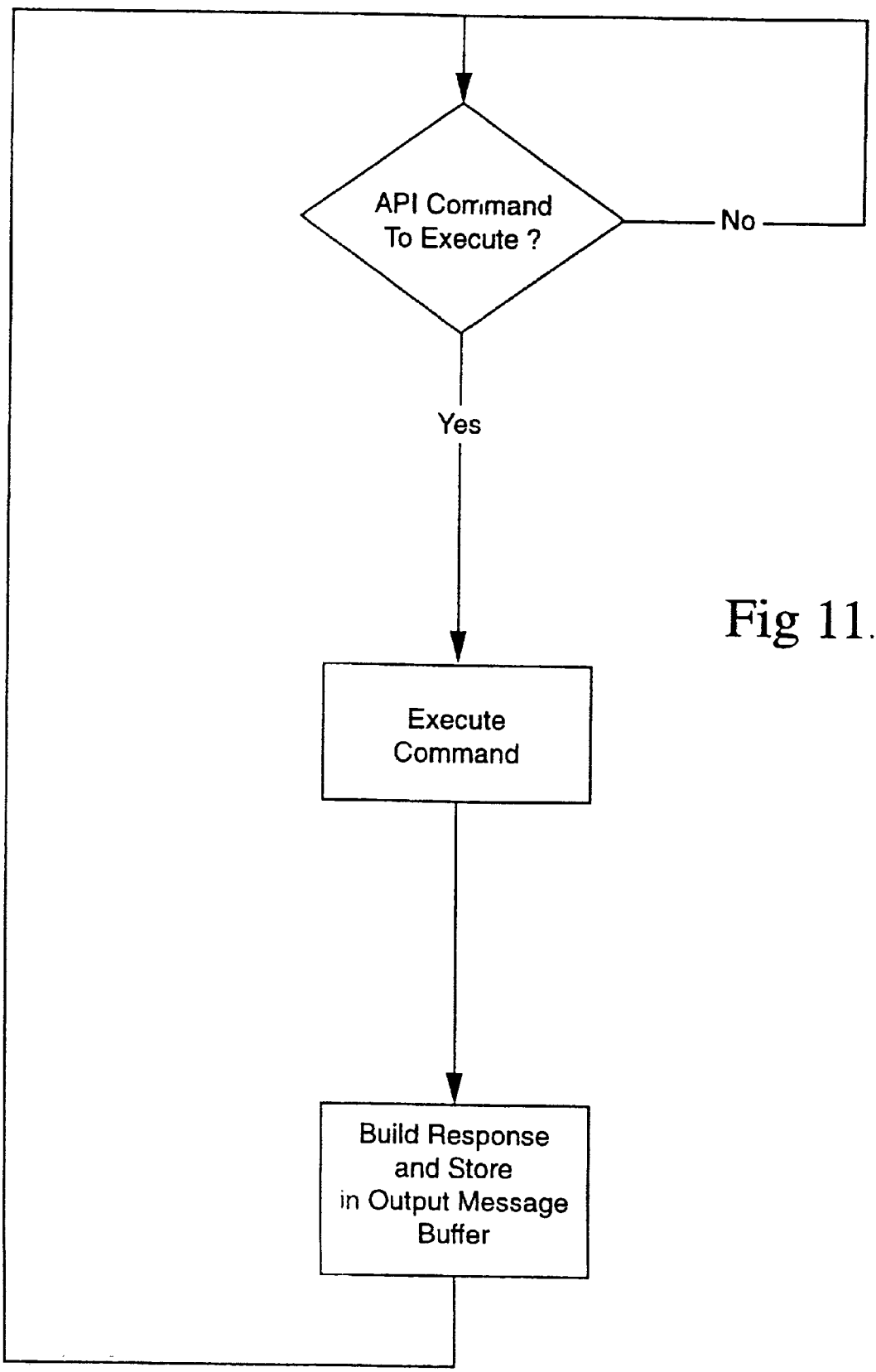
FIG. 11 is a flow chart of API execution according to the implementation of FIG. 9.

FIG. 11 is a flow chart illustrating the API executive. Execution begins in the idle state, which waits for a valid command to arrive. The response after execution of the command is built into a message and stored in the output message buffer. The API command set is divided into command types depending upon the peripherals associated with the command. An exemplary API command set breakdown is as follows:

Display functions, console functions (keypad), smart card functions, communications functions, secure key and PIN management functions, and magnetic card functions. All of these relate to specific peripherals or objects within the terminal itself, not to any specific scheme application.

Low level hardware dependent routines associated with each peripheral in the remote smart card terminal are contained in the BIOS.

The primary function of the scheme selector is to link an application to a user smartcard within the structure of each of the embodiments of the inventive systems described above. The following description relates to hardware and software requirements for a generic scheme selector which can be configured to meet the requirements of a given system. In its simplest form a single scheme selector acts as a bridge between an existing base terminal and one or more remote terminals. In the case of the embodiment described with reference to FIGS. 5 and 6, in addition to this function significant hardware and software relating to running the applications may be added. It will be understood that the applications are determined by card providers and will be familiar to those skilled in the art, and hence no detailed discussion will be provided.

Figure 12:
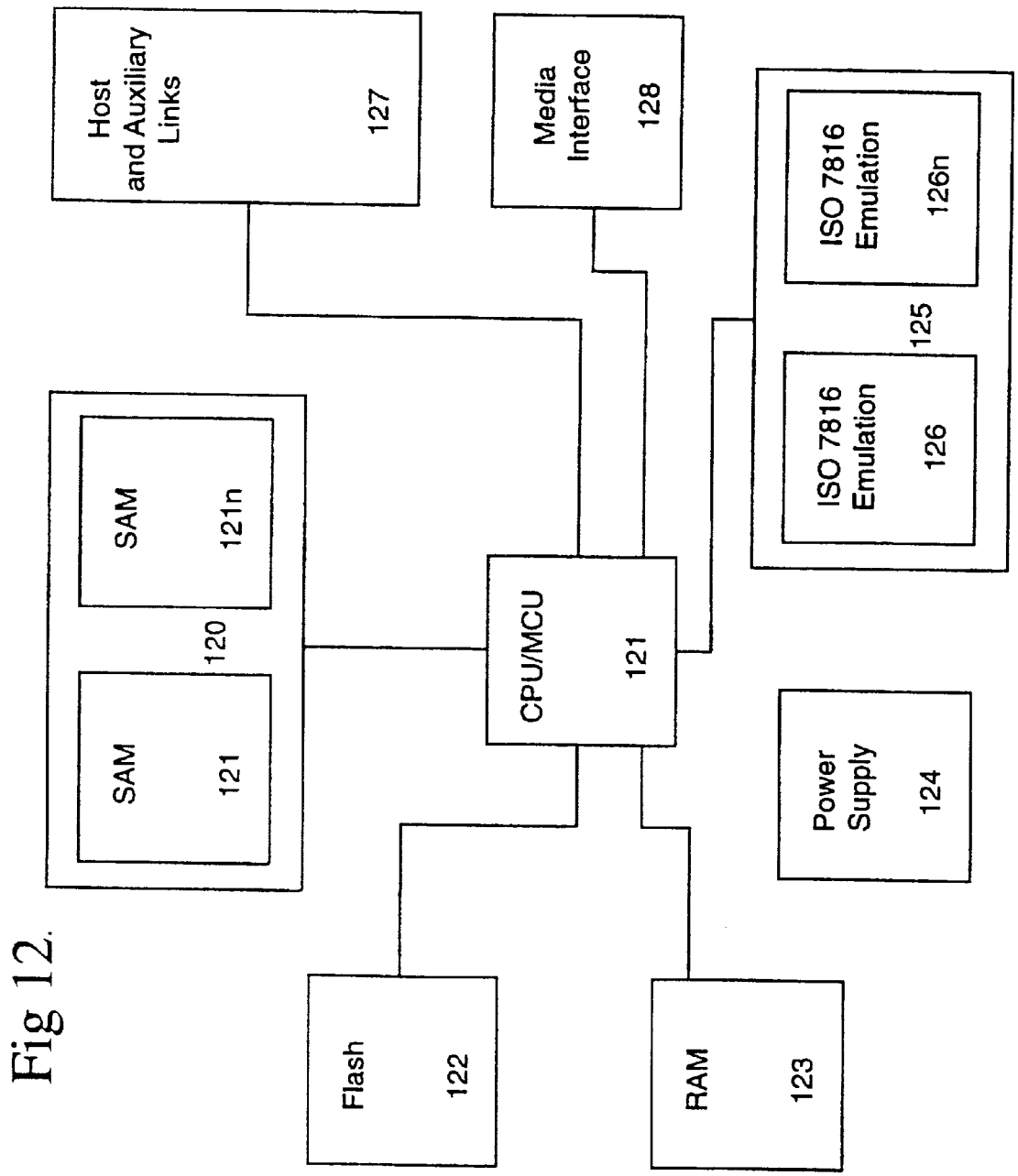
FIG. 12 is a hardware block diagram of a generic scheme selector according to the present invention.

Referring to FIG. 12, a generic scheme controller illustratively includes a central processor 121, external code storage flash EEROM memory 122, external data storage RAM 123, power supply and supervisory block 124, a set 125 of ISO7816 card emulation interfaces 126, 126n, media interface 128, auxiliary and host link interfaces 127 and a set 120 of secure access modules 121, 121n. In the case of the embodiments described above with reference to FIGS. 3 and 4, hardware resources are not required to run integrated applications, and hence lower capacity microcontrollers can be used.

The CPU 121 may be a dedicated processor or implemented as part of an integrated microcontroller. Preferably, 16 bit performance with a direct memory addressing range of 128K bytes or greater is required to run integrated applications. The reader will appreciate that component selection is dependant upon the tasks required.

External code storage 122 is preferably provided by a flash EEROM. This allows for applications to be downloaded or configured remotely. Alternative code storage memory such as ROM or EPROM may be used. Code storage may be internal ROM in the case of MCU based implementations.

External data storage 123 is generally required to run integrated applications. In this case transactions may be buffered until the host system is available to process them. Transaction buffering may require non-volatile storage in which case flash EEROM is preferred. Temporary data storage in fast access time RAM is also preferably provided.

The ISO7816 card emulation interfaces 126, 126n are particularly required in the case of the embodiments of FIGS. 3 and 4, as it is necessary for the hardware to look identical to a smartcard from the existing base terminal's perspective. The media interface 128 used depends upon the transmission media used, as discussed in the context of the remote terminal. The power and supervisory block 124 provides the voltage sources and supervisory signals required.

A host interface 127 is required particularly for the embodiments described with reference to FIGS. 5 and 6. Auxiliary interfaces to other peripheral devices may also be required, and may conveniently be RS 232 links. Secure access modules 121, 121n are required for most integrated scheme applications.

Figure 13:
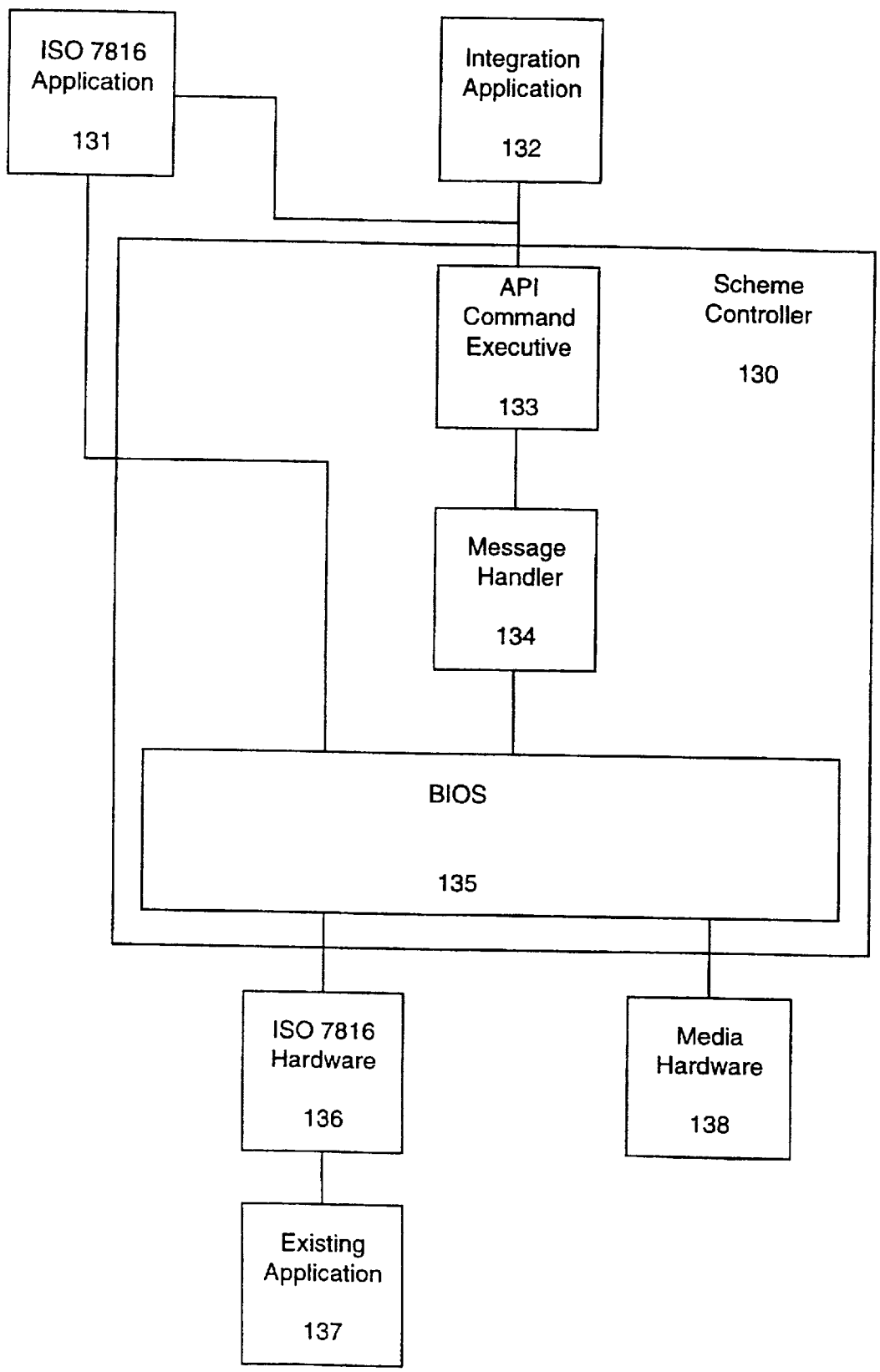
FIG. 13 is a functional diagram of a generic model for a scheme selector according to the present invention.

Referring to FIG. 13, the software design is intended to provide an efficient and intelligent link between the user smartcard and an application. At the top level, a generic model of a scheme selector includes an integrated application 132 or ISO7816 emulation application 131, with associated ISO7816 hardware 136 and an existing terminal application 137.

In the case of the embodiments of FIGS. 3 and 4, the ISO7816 emulation application 131 provides the scheme controller 130 with access to external applications. From the existing application ISO7816 protocol commands are converted to API commands compatible with the API command executive 133.

Going the other way, the API commands from the API command executive are converted to ISO7816 protocol responses. In systems of the type shown in FIGS. 5 and 6, the integrated application 132 communicates directly via the API command set. The BIOS 135 provides low level hardware interfaces.

Figure 14:
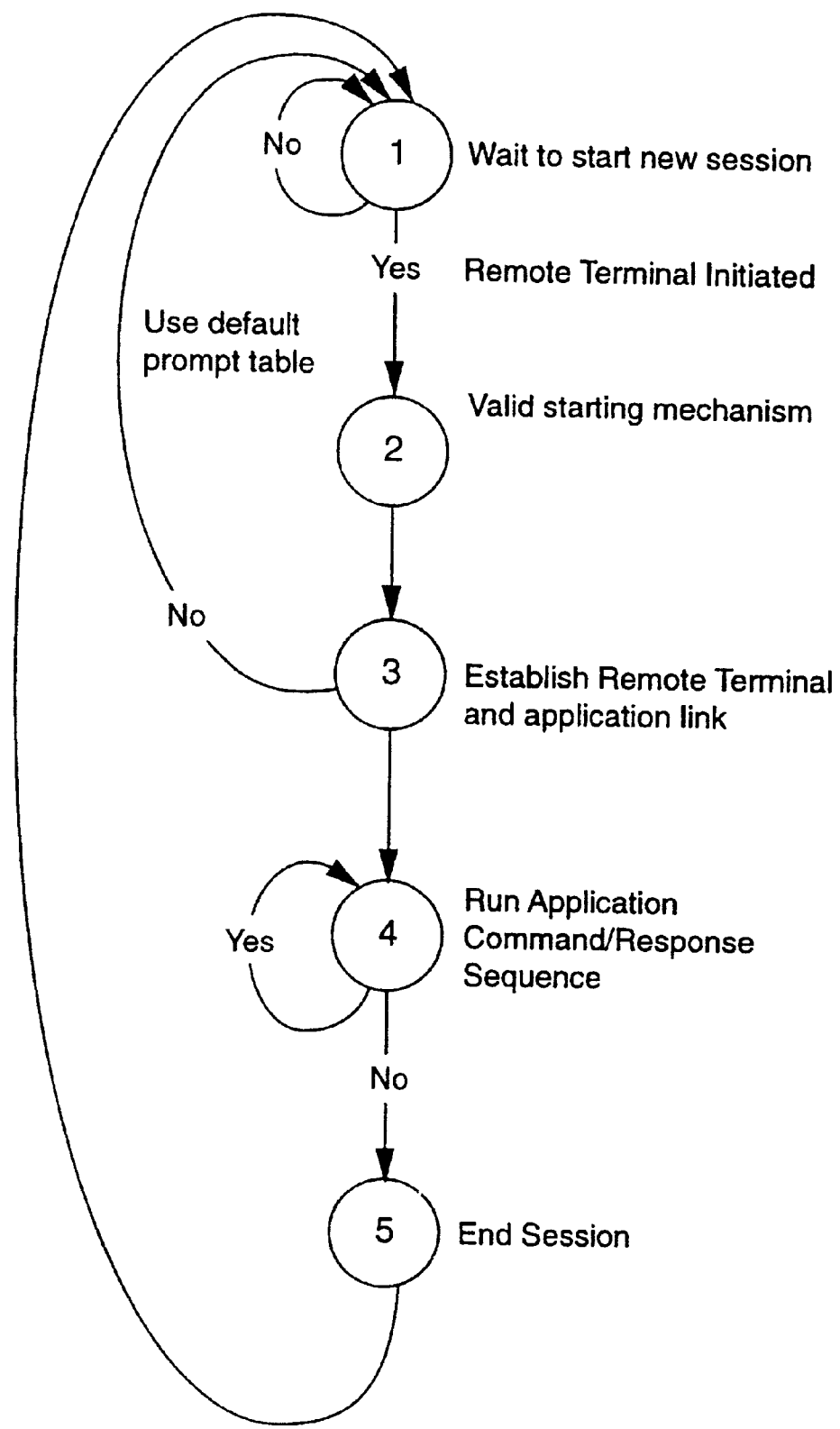
FIG. 14 is a flowchart for the scheme selector software.

Referring to FIG. 14, software flow is illustrated. Execution begins with the message handler 1 waiting to establish a new session with one or more remote terminals. Once a remote terminal (RSCT) initiates a service request, the scheme selector validates the starting mechanism 2 to ensure the request is valid. The link is the established 3 between the scheme selector and the user smartcard via the RSCT. The scheme selector then passes the request to the correct application 4. A command response sequence then continues for the duration of the transaction. Either the application or the user may end the transaction, thus ending the session 5. Execution then loops back to 1.

Table 1, appearing on the following pages, is an example of a single RSCT to single integrated application user smartcard transaction. The sequence number in the left hand column shows the logical steps in the process. Parallel events can be seen across each row in the table for the card user, remote terminal, media, scheme selector and scheme application.

It will be appreciated that variations and additions are possible within the spirit and scope of the invention without departing from the general inventive concept.

TABLE 1

System Performance Estimation

| Seq No | User Entry | Remote Smart Card Terminal | Media | Scheme Selector | Scheme Application |
|---|---|---|---|---|---|
| 1. | | Power up | | Respond to scheme smart card not inserted | Polling for smart card inserted |
| 2. | | Display Menu (assume scheme table has been loaded) | | | |
| 3. | | Selected Scheme from menu | | | |
| 4. | | Wait for Smart Card Insertion | | | |
| 5. | Insert card | | | | |
| 6. | | Power Smart card | | | |
| 7. | | Read Reset Data | | | |
| 8. | | Send RSCT ID. Scheme ID and Reset Data | | | |
| 9. | | | Network packet [1] | | |
| 10. | | | | Receive RSCT ID. Reset Data and Scheme ID | |
| 11. | | | | Establish session with RSCT and Application | |
| 12. | | | | Respond to scheme smart card inserted | |
| 13. | | | | | Issue Power up smart card command |
| 14. | | | | Send Reset Data to Scheme Application | |
| 15. | | | | | Issue a TO protocol command to get balance |
| 16. | | | | Receive API command and send to RSCT | |
| 17. | | | Network Packet [2] | | |
| 18. | | Receive Packet | | | |
| 19. | | Execute API command (Send TO command to user smart card) | | | |
| 20. | | Get result from user smart card | | | |
| 21. | | Send result | | | |
| 22. | | | Network Packet [3] | | |
| 23. | | | | Receive Result | |
| 24. | | | | Send Result in Application | |
| 25. | | | | | Process result |
| 26. | | | | | Assume OK Display "Balance is Result" on display |

TABLE 1-continued

System Performance Estimation

| Seq No | User Entry | Remote Smart Card Terminal | Media | Scheme Selector | Scheme Application |
|---|---|---|---|---|---|
| 27. | | | | Receive API Display command and send to RSCT | |
| 28. | | | Network Packet [4] | Respond with card inserted | Polling for smart card removed |
| 29. | | Receive packet | | | |
| 30. | | Execute API command (Display the message "Balance is Result") | | | Display "Please remove card" |
| 31. | | | | Receive API Display command and send to RSCT | |
| 32. | card removed | | Network Packet [5] | | Polling for smart card removed |
| 33. | | Send Card Removed and end session | | | |
| 34. | | | Network Packet [6] | | |
| 35. | | | | Session ended | |
| 36. | | | | Respond to application card removed | |

What is claimed is:

1. A system for performing a transaction using a smartcard, said smartcard including an application allowing transactions with at least one transaction scheme, said system comprising:
   at least one remote terminal device, each said remote terminal device including means for interfacing to a smartcard;
   a scheme independent terminal application, and communications means for communicating with a base terminal, said base terminal including a plurality of smartcard terminal applications for different transaction schemes; and
   means for selecting one of said smartcard terminal applications corresponding to an available transaction scheme for any given smartcard;
   whereby upon a smartcard being inserted into the remote terminal, a corresponding terminal application is selected and a transaction conducted between the terminal application and the smartcard as if the smartcard were directly interfaced to the base terminal.

2. A system according to claim 1, wherein the communications means is wireless.

3. A system according to claim 1, wherein said base terminal further comprises host communication means for connecting each terminal application to a corresponding remotely located host.

4. A system according to claim 3, wherein the transaction is a financial transaction.

5. A system according to claim 1, wherein the remote terminal includes input keys and display means.

6. A system for performing a transaction using a smartcard, said smartcard including an application allowing transactions with at least one transaction scheme, said system including at least one remote terminal device, each said remote terminal device including means for interfacing to a smartcard, and communications means for communicating with a base terminal, said base terminal including a plurality of smartcard transaction applications corresponding to an available transaction scheme for a given smartcard, the arrangement being such that a transaction occurs between the smartcard and the base terminal as if the smartcard were directly interfaced to the base terminal.

7. A system according to claim 6, wherein the communications means is wireless.

8. A system according to claim 6, wherein said base terminal further comprises host communication means for connecting each terminal application to a corresponding remotely located host.

9. A system according to claim 8, wherein the transaction is a financial transaction.

10. A system according to claim 6, wherein the remote terminal includes input keys and display means.

11. A remote terminal device for a smartcard transaction processing system, said system including a plurality of smartcards, each smartcard including applications allowing transactions with at least one transaction scheme, and a base terminal including transaction applications corresponding to at least one of the transaction schemes incorporated in said smartcards,
   wherein said terminal device including means for interfacing to a smart card, a scheme independent terminal application, and communications means for communicating with the base terminal, said remote terminal device being adapted to communicate with said smartcard and said base terminal so as to facilitate a transaction between the smartcard and the base terminal as if the smartcard were directly interfaced to the base terminal.

12. A remote terminal device according to claim 11, wherein the terminal device is adapted to communicate with a smartcard via an ISO 7816 interface.

13. A remote terminal device according to claim 11, wherein the terminal device is adapted to communicate with said base station via a wireless connection.

14. A remote terminal device according to claim 11, wherein said remote terminal device includes input keys and display means.

15. A remote terminal device according to claim 12, wherein said remote terminal device includes input keys and display means.

16. A remote terminal device according to claim 13, wherein said remote terminal device includes input keys and display means.

* * * * *